United States Patent [19]

Inui et al.

[11] Patent Number: 4,916,960
[45] Date of Patent: * Apr. 17, 1990

[54] MANUAL TRANSMISSION FOR MOTOR VEHICLE

[75] Inventors: Masaki Inui; Masakazu Ishikawa, both of Toyota, Japan

[73] Assignee: Toyota Jidosha Kabushiki Kaisha, Japan

[*] Notice: The portion of the term of this patent subsequent to Feb. 20, 2007 has been disclaimed.

[21] Appl. No.: 233,035

[22] Filed: Aug. 17, 1988

[30] Foreign Application Priority Data

Aug. 18, 1987 [JP] Japan ............................ 62-204391
Aug. 18, 1987 [JP] Japan ............................ 62-204392
Sep. 3, 1987 [JP] Japan ....................... 62-134835[U]

[51] Int. Cl.⁴ .......................................... F16H 3/08
[52] U.S. Cl. ..................................... 74/331; 74/333; 74/354; 74/357
[58] Field of Search ................. 74/331, 333, 357–360

[56] References Cited

U.S. PATENT DOCUMENTS

| | | | |
|---|---|---|---|
| 3,916,710 | 11/1975 | Sisson et al. | 74/331 |
| 4,458,551 | 7/1984 | Winter-Peter | 74/477 |
| 4,476,748 | 10/1984 | Morscheck | 74/331 X |
| 4,685,343 | 8/1987 | Ehrlinger et al. | 74/359 X |
| 4,754,665 | 7/1988 | Vandervoort | 74/331 X |

FOREIGN PATENT DOCUMENTS

| | | | |
|---|---|---|---|
| 468647 | 3/1971 | Japan . | |
| 5844551 | 9/1983 | Japan . | |
| 766214 | 1/1957 | United Kingdom | 74/331 |
| 1094811 | 12/1967 | United Kingdom . | |

Primary Examiner—Dwight G. Diehl
Attorney, Agent, or Firm—Oliff & Berridge

[57] ABSTRACT

A variable speed manual transmission includes an input shaft having a first drive gear for low speed drive and a second drive gear for high speed drive fixed thereon, an output shaft located under the input shaft and in parallel therewith and having at least a pair of axially spaced changed-speed driven gears fixed thereon, a first countershaft arranged in parallel with the input and output shafts and having a first driven gear fixed thereon and continuously engaged with the first drive gear, a pair of axially spaced low speed drive gears rotatably mounted thereon and continuously engaged with the change-speed driven gears on the output shaft, and a first synchronizer coupling provided thereon to selectively connect the low speed drive gears to the first countershaft, and a second countershaft arranged in parrallel with the input and output shafts and having a second drive gear fixed thereon and continuously engaged with the second drive gear on the input shaft, a pair of axially spaced high speed drive gears rotatably mounted thereon and continuously engaged with the change-speed driven gears on the output shaft, and a second synchronizer coupling provided thereon to selectively connect the high speed drive gears to the second countershaft.

10 Claims, 7 Drawing Sheets

MANUAL TRANSMISSION FOR MOTOR VEHICLE

BACKGROUND OF THE INVENTION

1. Field of the Invention

The present invention relates to a manual transmission for motor vehicles, and more particularly to a variable speed manual transmission of the type which includes four axes upon which the drive elements are mounted.

2. Description of the Prior Art

U.S. Pat. No. 4,458,551 discloses a variable speed manual transmission which includes an input shaft having a drive pinion fixed thereon, an output shaft coaxial with the input shaft and having a first synchronizer coupling adapted to selectively connect the input shaft to the output shaft and first, second, third, fourth and fifth pinions, a first intermediate shaft having first and second gears fixed thereon and located on opposite axial ends of the first synchronizer coupling, a second synchronizer coupling mounted thereon, and third and fourth gears selectively connectable to the first intermediate shaft by the second synchronizer coupling, and a second intermediate shaft having a fifth gear fixed thereon, a third synchronizer coupling mounted thereon, and sixth and seventh gears selectively connectable to the second intermediate shaft by the third synchronizer coupling. The third, fourth and fifth pinions are continuously engaged with the third, fourth and sixth gears, respectively, the first pinion is continuously engaged with the second gear, and the first and fifth gears are continuously engaged with the drive pinion. In such an arrangement, the axial length of the transmission may not be shortened due to coaxial arrangement of the input and output shafts, and the output shaft is located at the same height as the input shaft. for these reasons, it is difficult to manufacture the manual transmission in a compact construction, and it is also difficult to mount the manual transmission on a desired portion of a motor vehicle.

SUMMARY OF THE INVENTION

It is, therefore, a primary object of the present invention to provide an improved manual transmission the output shaft of which is located under the input shaft and in parallel therewith to shorten the axial length of the transmission and to facilitate the mounting of the transmission on a motor vehicle.

According to the present invention, the primary object is attained by providing a manual transmission which includes an input shaft having a first drive gear of small diameter for low speed drive and a second drive gear of large diameter for high speed drive fixed thereon; an output shaft arranged under the input shaft and in parallel therewith and having at least a pair of axially spaced change-speed driven gears fixed thereon; a first countershaft arranged in parallel with the input and output shafts and having a first driven gear fixed thereon and continuously engaged with the first drive gear on the input shaft, a pair of axially spaced low speed drive gears rotatably mounted thereon and continuously engaged with the change-speed driven gears on the output shaft, and a first synchronizer coupling provided thereon to selectively connect the low speed drive gears to the first countershaft; and a second countershaft arranged in parallel with the input and output shafts and the first countershaft and having a second driven gear fixed thereon and continuously engaged with the second drive gear on the input shaft, a pair of axially spaced high speed drive gears rotatably mounted thereon and continuously engaged with the change-speed driven gears on the output shaft, and a second synchronizer coupling provided thereon to selectively connect the high speed drive gears to the second countershaft.

In a practical embodiment of the present invention, it is preferable that the output shaft has an additional high speed driven gear rotatably mounted thereon and continuously engaged with the second driven gear on the second countershaft and a third synchronizer coupling provided thereon to connect the additional high speed driven gear to the output shaft. In this embodiment, it is desirable that the third synchronizer coupling is arranged in parallel with the first drive gear of small diameter on the input shaft.

BRIEF DESCRIPTION OF THE DRAWINGS

Other objects, features and advantages of the present invention will be more readily appreciated from the following detailed description of preferred embodiments thereof when considered with reference to the accompanying drawings, in which.

DESCRIPTION OF THE PREFERRED EMBODIMENTS

Figure 1:
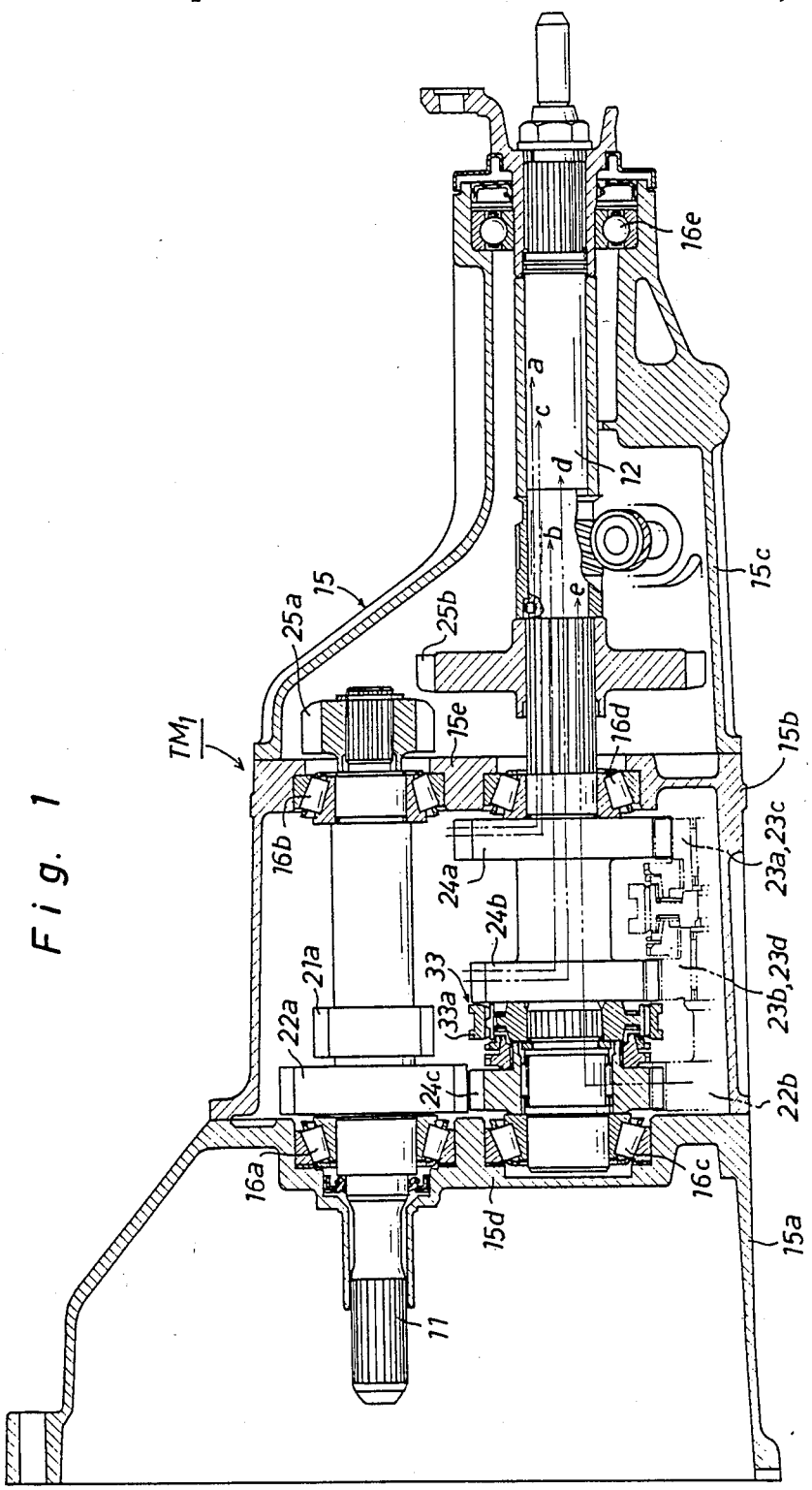
FIG. 1 is a sectioned side view of a variable speed manual transmission according to the present invention, being taken at plane I—I in FIG. 3.
Figure 2:
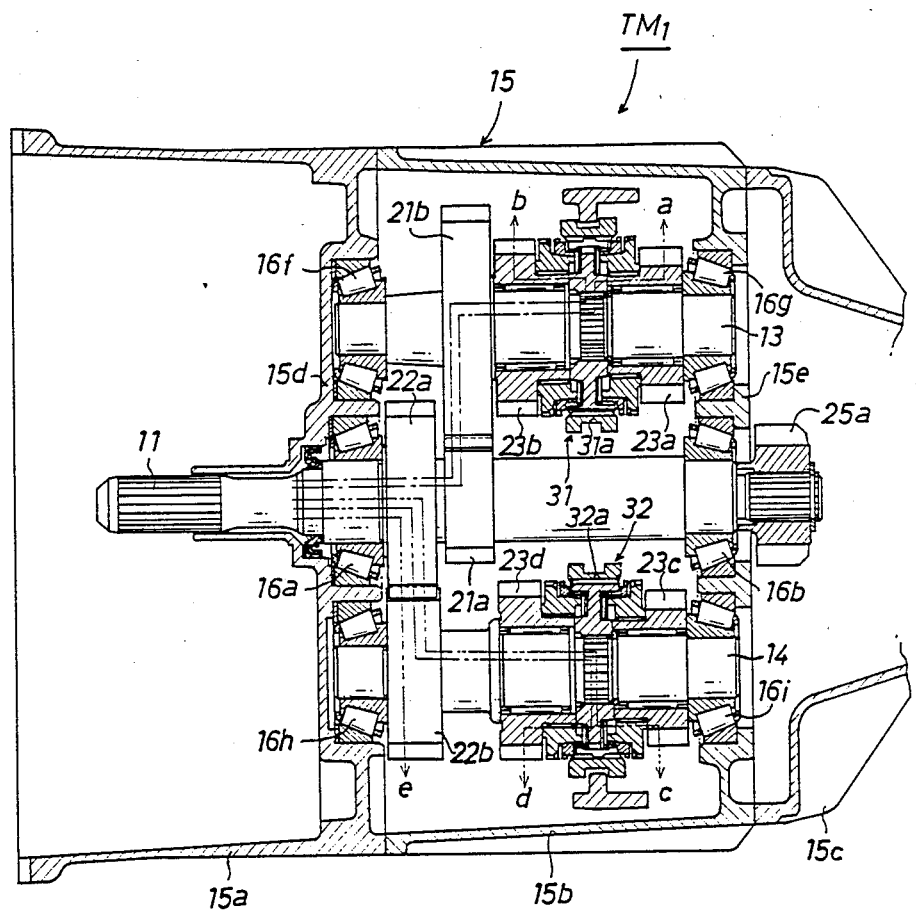
FIG. 2 is a sectioned plan view of the manual transmission taken at plane II—II in FIG. 3.
Figure 3:
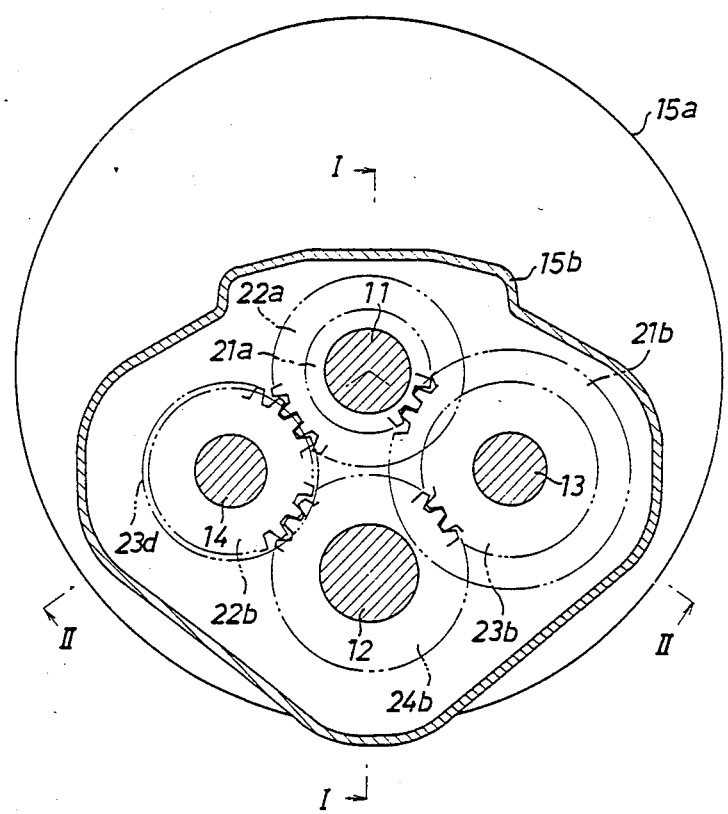
FIG. 3 is a cross-sectional view schematically illustrating an arrangement of four axes in the manual transmission.

As illustrated in FIGS. 1-3 of the drawings, a variable speed manual transmission $TM_1$ according to the present invention has an input shaft 11, an output shaft 12 and two parallel countershafts 13, 14 rotatably mounted within a housing assembly 15 including a clutch housing part 15a, a transmission housing part 15b and an extension housing part 15c fastened together to be mounted as a unit on a motor vehicle of the front-engine rear-wheel drive type. The input shaft 11 is rotatably supported by a pair of axially spaced tapered roller bearings 16a and 16b respectively carried on upright rear end walls 15d and 15e of housing parts 15a and 15b. The output shaft 12 is located under the input shaft shaft 11 and in parallel therewith and is rotatably supported by a pair of axially spaced tapered roller bearings 16c and 16d respectively carried on the upright rear end walls 15d and 15e and further supported by a ball bearing 16e carried on the rear end of housing part 15c.

As shown in FIG. 2, the countershafts 13 and 14 are arranged in parallel with the input and output shafts 11 and 12 at opposite sides thereof and are each located between the input and output shafts 11 and 12 in a vertical plane. The first countershaft 13 is rotatably supported by a pair of axially spaced tapered roller bearings 16f and 16g carried on the upright rear end walls 15d and 15e of housing parts 15a and 15b. Similarly, the second countershaft 14 is rotatably supported by a pair of axially spaced tapered roller bearings 16h and 16i carried on the upright rear end walls 15d and 15e of housing parts 15a and 15b.

The input shaft 11 has a first drive gear 21a of small diameter for low speed drive and a second drive gear 22a of large diameter for high speed drive fixedly mounted thereon. The first drive gear 21a is continuously in meshing engagement with a first driven gear 21b of large diameter integrally provided on the first countershaft 13, while the second drive gear 22a is continuously in meshing engagement with a second driven gear 22b of small diameter integrally provided on the second countershaft 14. The first countershaft 13 has first and second forward drive gears 23a and 23b rotatably mounted thereon and a first synchronizer coupling 31 mounted thereon between the first and second forward drive gears 23a and 23b. When a clutch sleeve 31a of coupling 31 is retained in a neutral position, the first and second forward drive gears 23a and 23b are conditioned to freely rotate on the first countershaft 13. The clutch sleeve 31a of coupling 31 is axially moved rearwards or forwards to selectively connect the first and second forward drive gears 23a and 23b to the first countershaft 13 for rotation therewith.

Similarly, the second countershaft 14 has third and fourth forward drive gears 23c and 23d rotatably mounted thereon and a second synchronizer coupling 32 mounted thereon between the third and fourth forward drive gears 23c and 23d. When a clutch sleeve 32a of coupling 32 is retained in a neutral position, the third and fourth forward drive gears 23c and 23d are conditioned to freely rotate on the second countershaft 14. The clutch sleeve 32a of coupling 32 is axially moved rearwards or forwards to selectively connect the third and fourth forward drive gears 23c and 23d to the second countershaft 14 for rotation therewith.

As shown in FIG. 1, the output shaft 12 is integrally provided thereon with a first driven gear 24a of large diameter for the first and third speed ratios and a second driven gear 24b of small diameter for the second and fourth speed ratios. As shown by imaginary lines in the figure, the first driven gear 24a is continuously in meshing engagement with both the first and third forward drive gears 23a and 23c, while the second driven gear 24b is continuously in meshing engagement with both the second and fourth forward drive gears 23b and 23d. The output shaft 12 has a third driven gear 24c for the fifth speed ratio rotatably mounted thereon and a third synchronizer coupling 33 provided thereon between the second and third driven gears 24b and 24c. The third driven gear 24c is continuously in meshing engagement with the second driven gear 22b integral with the second countershaft 14. When a clutch sleeve 33a of coupling 33 is axially moved forwards, the third driver gear 24c is connected to the output shaft 12 for rotation therewith.

In addition, the input shaft 11 of manual transmission $TM_1$ is arranged to be drivingly connected to a crankshaft of a prime mover of the vehicle through a clutch mechanism (not shown), while the output shaft 12 is arranged to be drivingly connected to a rear propeller shaft (not shown). At the rear end of input shaft 11, there is a fixedly mounted reverse drive gear 25a that is arranged to be brought into meshing engagement with an axially shiftable reverse driven gear 25b splined to the output shaft 12.

In operation, the power applied to input shaft 11 is transmitted to the first countershaft 13 through gears 21a and 21b and to the second countershaft 14 through gears 22a and 22b. When the first synchronizer coupling 31 is moved rearwards to connect the first forward drive gear 32a to the first countershaft 13, the power is transmitted to the output shaft 14 through the first driven gear 24a as shown by a dash and dotted line a in FIGS. 1 and 2. When the first synchronizer coupling 31 is moved forwards to connect the second forward drive gear 32b to the first countershaft 13, the power is transmitted to the output shaft 12 through the second driven gear 24b as shown by a dash and dotted line b in FIGS. 1 and 2. When the second synchronizer coupling 32 is moved rearwards to connect the third forward drive gear 23c to the second countershaft 14, the power is transmitted to the output shaft 12 through the first driven gear 24a as shown by a dash and two-dotted line c in FIGS. 1 and 2. When the second synchronizer coupling 32 is moved forwards to connect the fourth forward drive gear 23d to the second countershaft 14, the power is transmitted to the output shaft 12 through the second driven gear 24d as shown by a dash and two-dotted line d in FIGS. 1 and 2. When the third synchronizer coupling 33 is moved forwards to connect the third driven gear 24c to the output shaft 12, the power is transmitted to the output shaft 12 through the driven gears 22b and 24c as shown by a dash and three-dotted lines e in FIGS. 1 and 2. In such a manner as described above, the power is transmitted to the output shaft 12 selectively at the five forward speed ratios.

In the manual transmission $TM_1$, it is to be noted that the output shaft 12 is located under the input shaft 11 and in parallel therewith and arranged also in parallel with the countershafts 13 and 14. With such an arrangement of the four shafts, the axial length of the manual transmission $TM_1$ can be shortened to provide the manual transmission in a compact construction. Since the distance between the axially spaced bearings is shortened, thermal influence to each preload of the bearings can be reduced. Furthermore, the rear propeller shaft for connection to the output shaft 12 can be arranged in a lower position than the input shaft 11 to facilitate the mounting of the manual transmission on the vehicle. The manual transmission $TM_1$ is further characterized in that the first and second synchronizer couplings 31 and 32 are arranged between the first and second driven gears 24a and 24b of output shaft 12 and that the third synchronizer coupling 33 is arranged in parallel with the first drive gear 21a of small diameter on input shaft 11. Such an arrangement of the synchronizer couplings is useful to shorten the axial length of the transmission.

Figure 4:
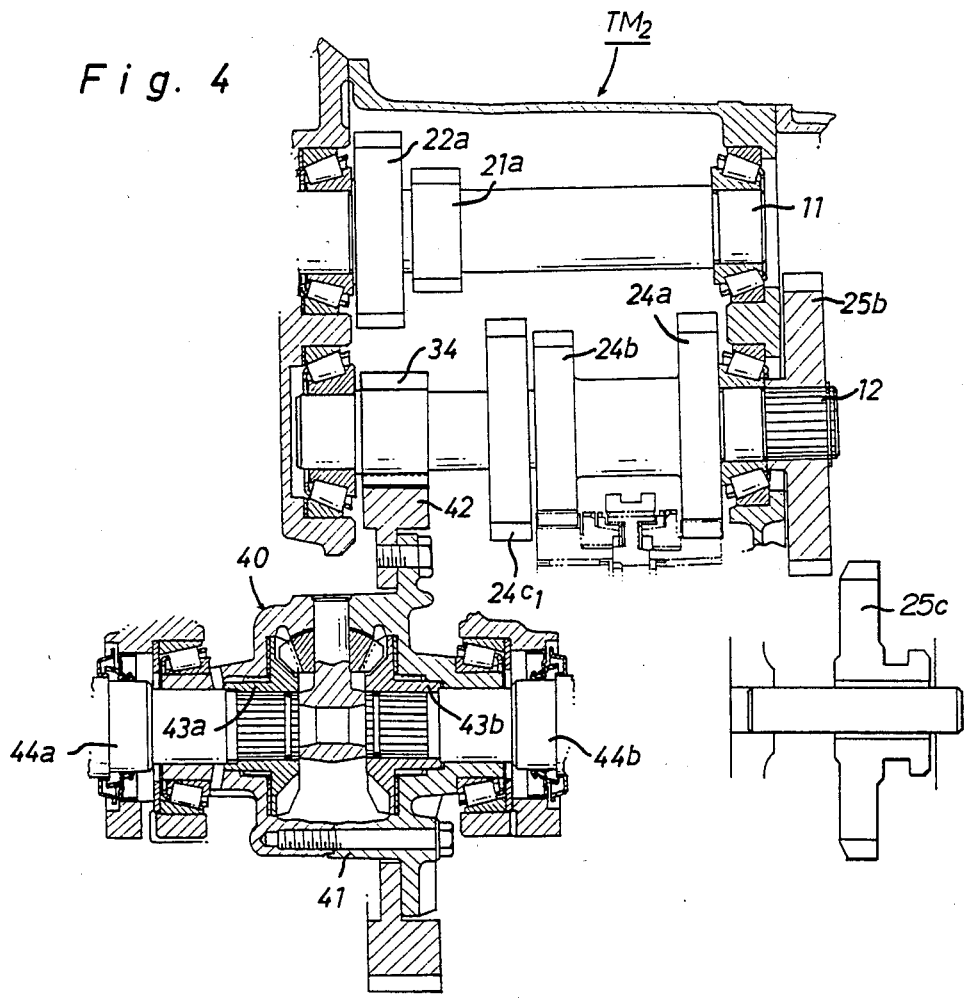
FIG. 4 is a sectioned side view of a modification of the manual transmission which corresponds with the illustration of FIG. 1.
Figure 5:
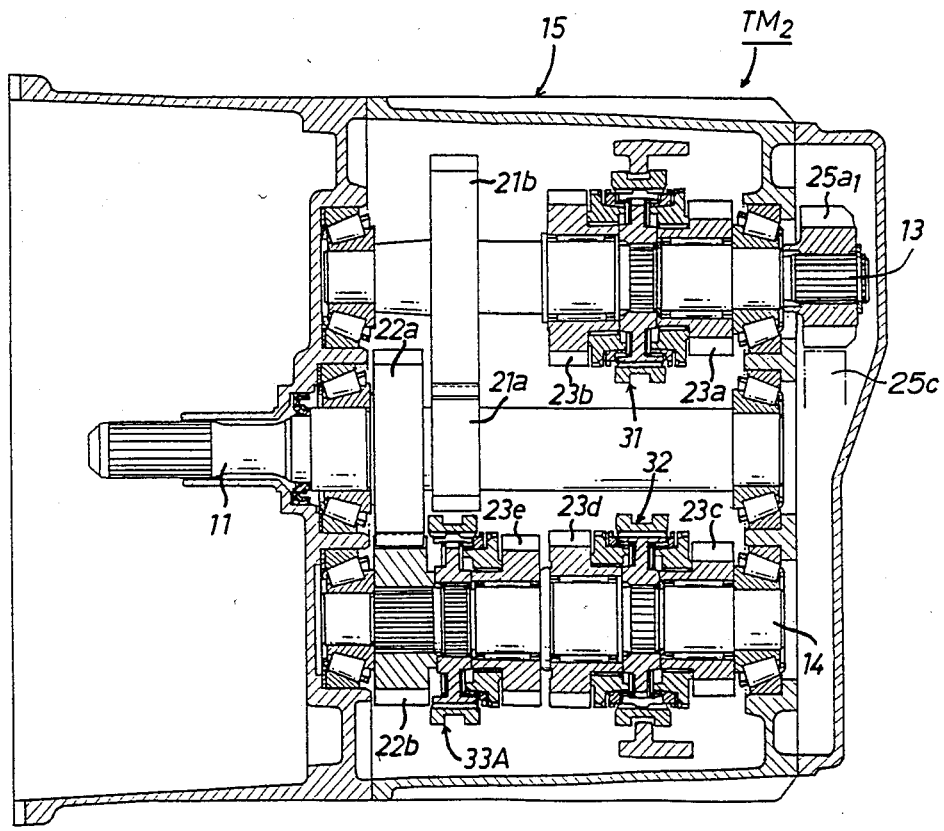
FIG. 5 is a sectioned plan view of the modification which corresponds with the illustration of FIG. 2.

In FIGS. 4 and 5 there is illustrated a modification of the manual transmission $TM_1$ which is arranged to be mounted on a motor vehicle of the front-engine front-wheel drive type. In the modified transmission $TM_2$, as shown in FIG. 4, the reverse drive gear 25a is eliminated fron the input shaft 11, the output shaft 12 is in the form of a short shaft which is integrally provided thereon with an output gear 34 and a driven gear $24c_1$ for the fifth speed ratio. The output gear 34 is substituted for the driven gear 24c shown in FIG. 1, and the driven gear 24c₁ is substituted for the third synchronizer coupling 33 shown in FIG. 1. As shown in FIG. 5, the modified transmission TM₂ includes a reserve drive gear 25a₁ fixedly mounted on the rear end of the first countershaft 13, a fifth forward drive gear 23e rotatably mounted on the second countershaft 14 adjacent the fourth forward drive gear 23d and connectable thereto, and a third synchronizer coupling 33A provided on the second countershaft 14 to connect the fifth forward drive gear 23e to the second countershaft 14 when it has been moved rearwards. The reverse drive gear 25a₁ is arranged to be brought into drive connection with the reverse driven gear 25b through an axially shiftable reverse idler gear 25c, and the fifth forward drive gear 23e is continuously in meshing engagement with the driven gear 24c₁. The other construction and components are substantially the same as those in the manual transmission TM₁ shown in FIGS. 1-3.

In the above modification, the output gear 34 of manual transmission TM₂ is continuously in meshing engagement with a ring gear 42 which is fixedly mounted on a differential case 41 in a front differential 40. Thus, the power applied to output shaft 12 is transmitted to the differential case 41 through the output and ring gears 34 and 42 and distributed to a pair of side shafts 44a and 44b through a pair of side gears 43a and 43b to drive a pair of front read wheels (not shown).

Figure 6:
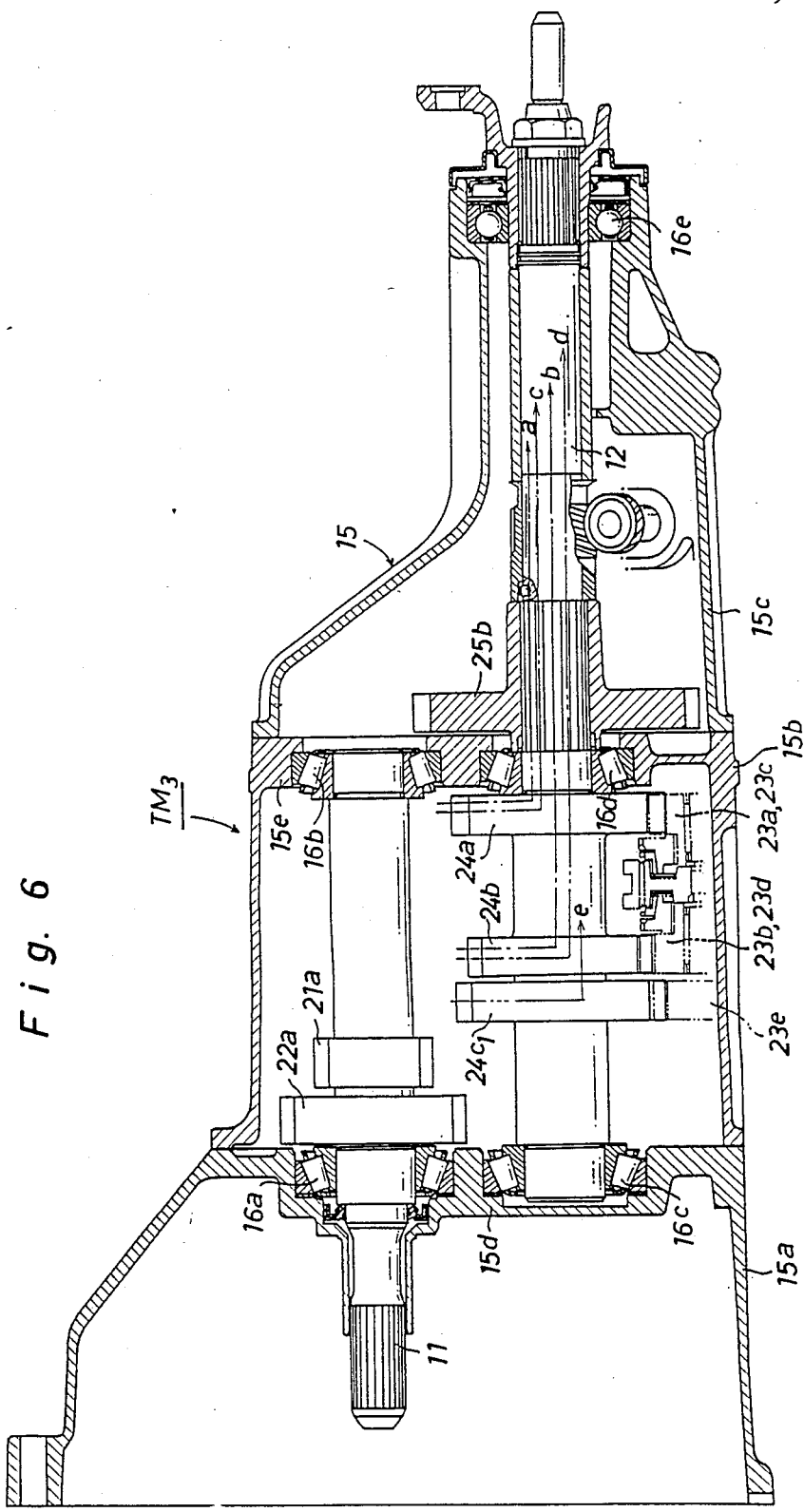
FIG. 6 is a sectioned side view of another modification of the manual transmission which corresponds with the illustration of FIG. 1.
Figure 7:
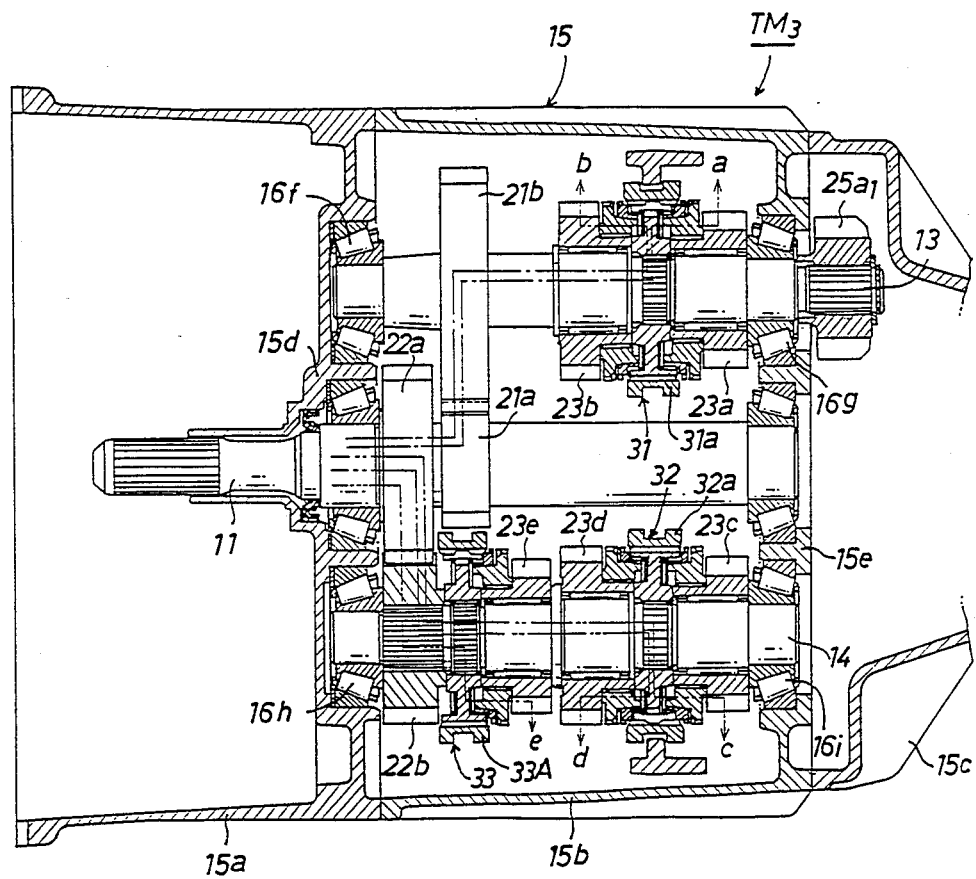
FIG. 7 is a sectioned plan view of the. modification shown in FIG. 6 which corresponds with the illustration of FIG. 2.

In FIGS. 6 and 7 there is illustrated another modification of the manual transmission TM₁ wherein the reserve drive gear 25a is eliminated from the input shaft 11, the driven gear 24c and third synchronizer coupling 33 are eliminated from the output shaft 12, and the reverse driven gear 25b is fixed in place on the output shaft 12. In the modified transmission TM₃, the output shaft 12 is integrally provided thereon with a driven gear 24c₁ for the fifth speed ratio which is arranged adjacent the second driven gear 24b. As shown in FIG. 7, the modified transmission TM₃ includes a reverse drive gear 25a₁ fixedly mounted on the rear end of the first countershaft 13 located in the interior of extension housing 15c, a fifth forward drive gear 23e rotatably mounted on the second countershaft 14 adjacent the fourth forward drive gear 23d and connectable thereto, and a third synchronizer coupling 33A provided on the second countershaft 14 to connect the fifth forward drive gear 23e to the second countershaft 14 when it has been moved rearwards. The reverse drive gear 25a₁ is arranged to be brought into drive connection with the reverse driven gear 25b through an axially shiftable reverse idler gear (not shown), and the fifth forward drive gear 23e is continuously in meshing engagement with the driven gear 24c₁. The other construction and components are substantially the same as those in the manual transmission TM₁ shown in FIGS. 1-3.

In operation, the power applied to input shaft 11 is transmitted to the first countershaft 13 through gears 21a and 21b and to the second countershaft 14 through gears 21a and 21b. When the third synchronizer coupling 33A is moved rearwards to connect the fifth forward drive gear 23e to the second countershaft 14, the power is transmitted to the output shaft 12 through the driven gear 24c₁ as shown by a dash and three-dotted line e in FIGS. 6 and 7. The other operation is substantially the same as that of the manual transmission TM₁ shown in FIGS. 1-3.

Having now fully set forth the structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of appended claims, the invention may be practiced otherwise than as specifically set forth herein.

What is claimed is:

1. A manual transmission for motor vehicles comprising:
   a housing assembly;
   an input shaft rotatably mounted within said housing assembly and having a first drive gear of small diameter for low speed drive and a second drive gear of large diameter for high speed drive fixed thereon;
   an output shaft rotatably mounted within said housing assembly and having an axis of rotation parallel to and spaced from a rotation axis of said input shaft, said output shaft having at least a pair of axially spaced change-speed driven gears mounted thereon;
   a first countershaft rotatably mounted within said housing assembly in parallel with said input and output shafts and having a first driven gear fixed thereon and continuously engaged with said first drive gear on said input shaft, a pair of axially spaced low speed drive gears rotatably mounted thereon and continuously engaged with the change-speed driven gears on said output shaft, and a first synchronizer coupling provided thereon to selectively connect said low speed drive gears to said first countershaft; and
   a second countershaft rotatably mounted within said housing assembly in parallel with said input and output shafts and said first countershaft and having a second drive gear fixed thereon and continuously engaged with said second drive gear on said input shaft, a pair of axially spaced high speed drive gears rotatably mounted thereon and continuously engaged with the change-speed driven gears on said output shaft, and a second synchronizer coupling provided thereon to selectively connect said high speed drive gears to said second countershaft.

2. A manual transmission for motor vehicles comprising:
   a housing assembly;
   an input shaft rotatably mounted within said housing assembly and having a first drive gear of small diameter for low speed drive and a second drive gear of large diameter for high speed drive fixed thereon;
   an output shaft rotatably mounted within said housing assembly in parallel with said input shaft, said output shaft having at least a pair of axially spaced change-speed driven gears mounted thereon;
   a first countershaft rotatably mounted within said housing assembly in parallel with said input and output shafts and having a first driven gear fixed thereon and continuously engaged with said first drive gear on said input shaft, a pair of axially spaced low speed drive gears rotatably mounted thereon and continuously engaged with the change-speed driven gears on said output shaft, and a first synchronizer coupling provided thereon to selectively connect said low speed drive gears to said first countershaft; and a second countershaft rotatably mounted within said housing assembly in parallel with said input and output shafts and said first countershaft and having a second driven gear fixed thereon and continuously engaged with said second drive gear on said input shaft, a pair of axially spaced high speed drive gears rotatably mounted thereon and continuously engaged with the change-speed driven gears on said output shaft, and a second synchronizer coupling provided thereon to selectively connect said high speed drive gears to said second countershaft, wherein said output shaft is located under said input shaft and in parallel therewith, said output shaft having an additional high speed driven gear rotatably mounted thereon and continuously engaged with said second driven gear on said second countershaft and a third synchronizer coupling provided thereon to connect said additional high speed driven gear to said output shaft.

3. A manual transmission as claimed in claim 2, wherein said third synchronizer coupling is arranged in parallel with said first drive gear of small diameter on said input shaft.

4. A manual transmission for motor vehicles comprising:

a housing assembly;

an input shaft rotatably mounted within said housing assembly and having a first drive gear of small diameter for low speed drive and a second drive gear of large diameter for high speed drive fixed thereon;

an output shaft rotatably mounted within said housing assembly in parallel with said input shaft, said output shaft having at least a pair of axially spaced change-speed driven gears mounted thereon;

a first countershaft rotatably mounted within said housing assembly in parallel with said input and output shafts and having a first driven gear fixed thereon and continuously engaged with said first drive gear on said input shaft, a pair of axially spaced low speed drive gears rotatably mounted thereon and continuously engaged with the change-speed driven gears on said output shaft, and a first synchronizer coupling provided thereon to selectively connect said low speed drive gears to said first countershaft; and a second countershaft rotatably mounted within said housing assembly in parallel with said input and output shafts and said first countershaft and having a second driven gear fixed thereon and continuously engaged with said second drive gear on said input shaft, a pair of axially spaced high speed drive gears rotatably mounted thereon and continuously engaged with the change-speed driven gears on said output shaft, and a second synchronizer coupling provided thereon to selectively connect said high speed drive gears to said second countershaft, wherein said output shaft has an additional driven gear fixedly mounted thereon and located adjacent one of said change-speed driven gears, said second countershaft having an additional high speed drive gear rotatably mounted thereon and continuously engaged with said additional driven gear and a third synchronizer coupling provided thereon to connect said additional high speed drive gear to said second countershaft.

5. A manual transmission as claimed in claim 4, wherein said third synchronizer coupling is arranged in parallel with said first drive gear on said input shaft.

6. A manual transmission for motor vehicles comprising:

a housing assembly;

an input shaft rotatably mounted within said housing assembly and having a first drive gear of small diameter for low speed drive and a second drive gear of large diameter for high speed drive fixed thereon;

an output shaft rotatably mounted within said housing assembly in parallel with said input shaft, said output shaft having at least a pair of axially spaced change-speed driven gears mounted thereon;

a first countershaft rotatably mounted within said housing assembly in parallel with said input and output shafts and having a first driven gear fixed thereon and continuously engaged with said first drive gear on said input shaft, a pair of axially spaced low speed drive gears rotatably mounted thereon and continuously engaged with the change-speed driven gears on said output shaft, and a first synchronizer coupling provided thereon to selectively connect said low speed drive gears to said first countershaft; and a second countershaft rotatably mounted within said housing assembly in parallel with said input and output shafts and said first countershaft and having a second driven gear fixed thereon and continuously engaged with said second drive gear on said input shaft, a pair of axially spaced high speed drive gears rotatably mounted thereon and continuously engaged with the change-speed driven gears on said output shaft, and a second synchronizer coupling provided thereon to selectively connect said high speed drive gears to said second countershaft, wherein said output shaft has an output gear fixedly mounted thereon and located in parallel with said second drive gear on said input shaft for drive connection to an input element of a front differential.

7. A manual transmission as claimed in claim 6, wherein said output shaft has an additional driven gear fixedly mounted thereon and located between one of said change-speed driven gears and said output gear, said second countershaft having an additional high speed drive gear rotatably mounted thereon and continuously engaged with said additional driven gear and a third synchronizer coupling provided thereon to connect said additional high speed drive gear to said second countershaft.

8. A manual transmission for motor vehicles comprising:

a housing assembly;

an input shaft rotatably mounted within said housing assembly and having a first drive gear of small diameter for low speed drive and a second drive gear of large diameter for high speed drive fixed thereon;

an output shaft rotatably mounted within said housing assembly in parallel with said input shaft, said output shaft having at least a pair of axially spaced change-speed driven gears mounted thereon;

a first countershaft rotatably mounted within said housing assembly in parallel with said input and output shafts and having a first driven gear fixed thereon and continuously engaged with said first drive gear on said input shaft, a pair of axially spaced low speed drive gears rotatably mounted thereon and continuously engaged with the change-speed driven gears on said output shaft, and a first synchronizer coupling provided thereon to selectively connect said low speed drive gears to said first countershaft; and a second countershaft rotatably mounted within said housing assembly in parallel with said input and output shafts and said first countershaft and having a second driven gear fixed thereon and continuously engaged with said second drive gear on said input shaft, a pair of axially spaced high speed drive gears rotatably mounted thereon and continuously engaged with the change-speed driven gears on said output shaft, and a second synchronizer coupling provided thereon to selectively connect said high speed drive gears to said second countershaft, wherein said housing assembly includes a clutch housing part, a transmission housing part and an extension housing part fastened together, and wherein all said drive and driven gears on said input and output shafts and all said driven and drive gears on said first and second countershafts are contained in said transmission housing part.

9. A manual transmission as claimed in claim 8, wherein said input shaft has a reverse drive gear fixedly mounted thereon and located in the interior of said extension housing part, and wherein said output shaft has an axially shiftable reverse driven gear mounted thereon and located in the interior of said extension housing part to be brought into meshing engagement with said reverse drive gear.

10. A manual transmission as claimed in claim 8, wherein said first countershaft has a reverse drive gear mounted thereon and located in the interior of said extension housing part, and wherein said output shaft has a reverse driven gear fixedly mounted thereon and located in the interior of said extension housing to be drivingly connected with said reverse drive gear through a reverse idler gear.

* * * * *